(12) United States Patent
Kitai et al.

(10) Patent No.: US 7,454,993 B2
(45) Date of Patent: Nov. 25, 2008

(54) DRIVE TRANSMISSION CHANGER FOR A DOG CLUTCH OF A VEHICLE

(75) Inventors: Haruo Kitai, Akashi (JP); Hiroyuki Fujimoto, Akashi (JP)

(73) Assignee: Kawasaki Jikogyo Kabushiki Kaisha, Hyogo (JP)

( * ) Notice: Subject to any disclaimer, the term of this patent is extended or adjusted under 35 U.S.C. 154(b) by 281 days.

(21) Appl. No.: 11/406,781

(22) Filed: Apr. 19, 2006

(65) Prior Publication Data
US 2007/0245841 A1    Oct. 25, 2007

(51) Int. Cl.
*F16H 59/00*    (2006.01)
(52) U.S. Cl. ........................................................ 74/335
(58) Field of Classification Search .................. 74/335, 74/411, 473.12; 192/84.6, 84.7
See application file for complete search history.

(56) References Cited
U.S. PATENT DOCUMENTS
4,805,472 A * 2/1989 Aoki et al. ..................... 74/335
6,862,946 B2 * 3/2005 Sumita et al. ............. 74/421 A
7,263,909 B2 * 9/2007 Weis ............................ 74/425

FOREIGN PATENT DOCUMENTS
JP       07-179133      7/1995
JP       2004-187378    7/2004

* cited by examiner

*Primary Examiner*—Dirk Wright

(57) ABSTRACT

To provide a drive transmission changer for a dog clutch of a vehicle, which is effective to achieve change of the drive transmission assuredly without requiring any complicated control and which can be assembled compact in size. The drive transmission changer includes a drive motor 1, an output shaft 2 including a shaft body 2a and an eccentric stud 2b, a gear 3 mounted on the shaft body 2a for rotation relative thereto and drivingly coupled with the drive motor 1, a first transmission member 4 rotatable together with the gear 3, a second transmission member 5 mounted on the shaft body 2a for rotation together therewith, and a torsion coil spring 6 operatively coupled between the first and second transmission members 4 and 5 and arranged coaxially with the shaft body 2a for accumulating a drive force as the first transmission member 4 rotates.

11 Claims, 8 Drawing Sheets

DRIVE TRANSMISSION CHANGER FOR A DOG CLUTCH OF A VEHICLE

BACKGROUND OF THE INVENTION

1. Field of the Invention

The present invention relates to a drive transmission changer for a dog clutch of a vehicle having a drive motor built therein.

2. Description of the Prior Art

An automotive vehicle having a two-wheel drive (2WD) mode, in which the drive output from the automotive power plant is transmitted only to rear or front wheels, and a four-wheel drive (4WD) mode, in which the drive output from the same automotive power plant is transmitted to the rear and front wheels, is known, in which a drive transmission changer is employed for selectively setting the automotive vehicle in one of the two-wheel drive modes and the four-wheel drive mode. The Japanese Laid-open Patent Publication No. 2004-187378, published Jul. 2, 2004, discloses the drive transmission changer utilizing an output shaft having an eccentric stud formed integrally with one end face thereof so as to extend parallel to, but laterally offset relative to the longitudinal axis of the output shaft.

This prior art drive transmission changer is operatively associated with a dog clutch comprised of a coupling shifter, engaged with a side face of the eccentric stud, and a counter-shift member drivingly coupled with the output shaft of the automotive power plant. Specifically, when the eccentric stud is rotated a predetermined angular distance in one direction about the longitudinal axis of the output shaft, the coupling shifter can be shifted linearly in a direction parallel to the axis of rotation of the counter-shift member until the coupling shifter is brought into engagement with the counter-shift member so that the rotation of the counter-shift member can be transmitted to the coupling shifter. On the other hand, when the eccentric stud is rotated in the reverse direction, the coupling shifter then engaged with the counter-shift member can be disengaged from the counter-shift member. In this way, the drive transmission changer is operable to selectively assume a drive coupling position to permit the automotive vehicle to be set in the four-wheel drive mode and a drive decoupling position to permit the automotive vehicle to be set in the two-wheel drive mode one at a time.

In order for the coupling shifter and the counter-shift member to be engaged with each other, the both must be held in phase matched relation with each other and, in order for the coupling shifter and the counter-shift member, which are engaged with each other, to be disengaged from each other, the engagement therebetween must not be firm and tough. However, if change of the drive transmission between the coupling shifter and the counter-shift member is forcibly performed, the drive motor used to drive the output shaft of the drive transmission changer will be loaded excessively. According to the Japanese publication referred to above, in order to avoid the excessive load from acting on the drive motor, a complicated control is effected to the drive motor to avoid the excessive load.

In contrast thereto, the Japanese Patent No. 3618112, first published Jul. 18, 1995 and patented Nov. 19, 2004, discloses the drive transmission changer of a structure, in which in the event that the drive transmission cannot be quickly changed in response to rotation of the drive motor, a driving force exerted by the drive motor is accumulated in a spiral spring with the drive motor then halted, but when the drive transmission is subsequently brought in position ready to change, the driving force so accumulated in the spiral spring is utilized to achieve the change of the drive transmission. Although the drive transmission changer disclosed in this Japanese patent is advantageous in that no complicated electric control of the drive motor is required, the drive transmission changer tends to become bulky because of the use of the spiral spring having a large maximum diameter.

SUMMARY OF THE INVENTION

In view of the foregoing, the present invention has for its essential object to provide a drive transmission changer for a dog clutch of a vehicle having a drive motor built therein, which is effective to achieve change of a drive transmission of a vehicle assuredly without requiring any complicated control and which can be assembled compact in size.

In order to accomplish the foregoing object, the present invention provides a drive transmission changer for a dog clutch of a vehicle including a drive motor, an output shaft including a shaft body and an eccentric stud formed at an output end portion of the output shaft and positioned offset laterally from a longitudinal axis of the shaft body and is adapted to be engaged with a coupling shifter of the dog clutch, a gear mounted on the shaft body for rotation relative thereto and drivingly coupled with the drive motor, a first transmission member rotatable together with the gear, a second transmission member mounted on the shaft body for rotation together therewith, and a torsion coil spring operatively coupled between the first and second transmission members and arranged coaxially with the shaft body of the output shaft for accumulating a drive force as the first transmission member rotates.

According to the present invention, the torsion coil spring accumulates the driving force exerted by the drive motor as the first transmission member is rotated about the output shaft. Accordingly, without any complicated electric control, the drive transmission can be changed assuredly by the drive transmission changer. Also, no spiral spring of a large maximum size need be employed and, instead, the torsion coil spring is employed, making it possible to compactize the drive transmission changer.

In a preferred embodiment of the present invention, the drive transmission changer may also include a sleeve mounted on the shaft body of the output shaft for rotation relative thereto. The gear and the first transmission member referred to above are mounted on the sleeve for rotation together therewith.

In another preferred embodiment of the present invention, the first and second transmission members may be made of a plate member including a body and a pair of arms extending from respective opposite portions of the body in a direction substantially axially of the shaft body of the output shaft. The body of the first transmission member is mounted on the sleeve for rotation together therewith, and the pair of the arms of the first transmission member extend in one direction and are engaged respectively with opposite engagement ends of the torsion coil spring. On the other hand, the body of the second transmission member is mounted on the shaft body of the output shaft for rotation together therewith, and the pair of the arms of the second transmission member extend in a direction counter to such one direction and are engaged respectively with the opposite engagement ends of the torsion coil spring.

The first and second transmission members can be manufactured by means of any known bending work and can therefore be manufactured easily and inexpensively. Also, considering that the opposite engagement ends of the torsion coil springs are engaged with both of the arms of the first and second transmission members, the drive transmission changer of the present invention can advantageously be configured to have a compact structure having an excellent workability.

In a further preferred embodiment of the present invention, the torsion coil spring may be in the form of a double coiled spring, so that the drive transmission changer can be manufactured further compact in size.

In a still further preferred embodiment of the present invention, a changer housing may be employed to accommodate therein the motor, the gear, the first and second transmission members and the torsion coil spring. The use of the changer housing allow all of the movable component parts, except for the output shaft, to be enclosed within such changer housing and, therefore, the sealability of the drive transmission changer to the outside environment can be increased advantageously.

Alternatively, the changer housing may be used to accommodate therein the gear, the first and second transmission members and the torsion coil spring, in which case the drive motor is positioned outside of, but supported by the changer housing and has an axis of rotation thereof, which lies parallel to the longitudinal axis of the shaft body of the output shaft.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
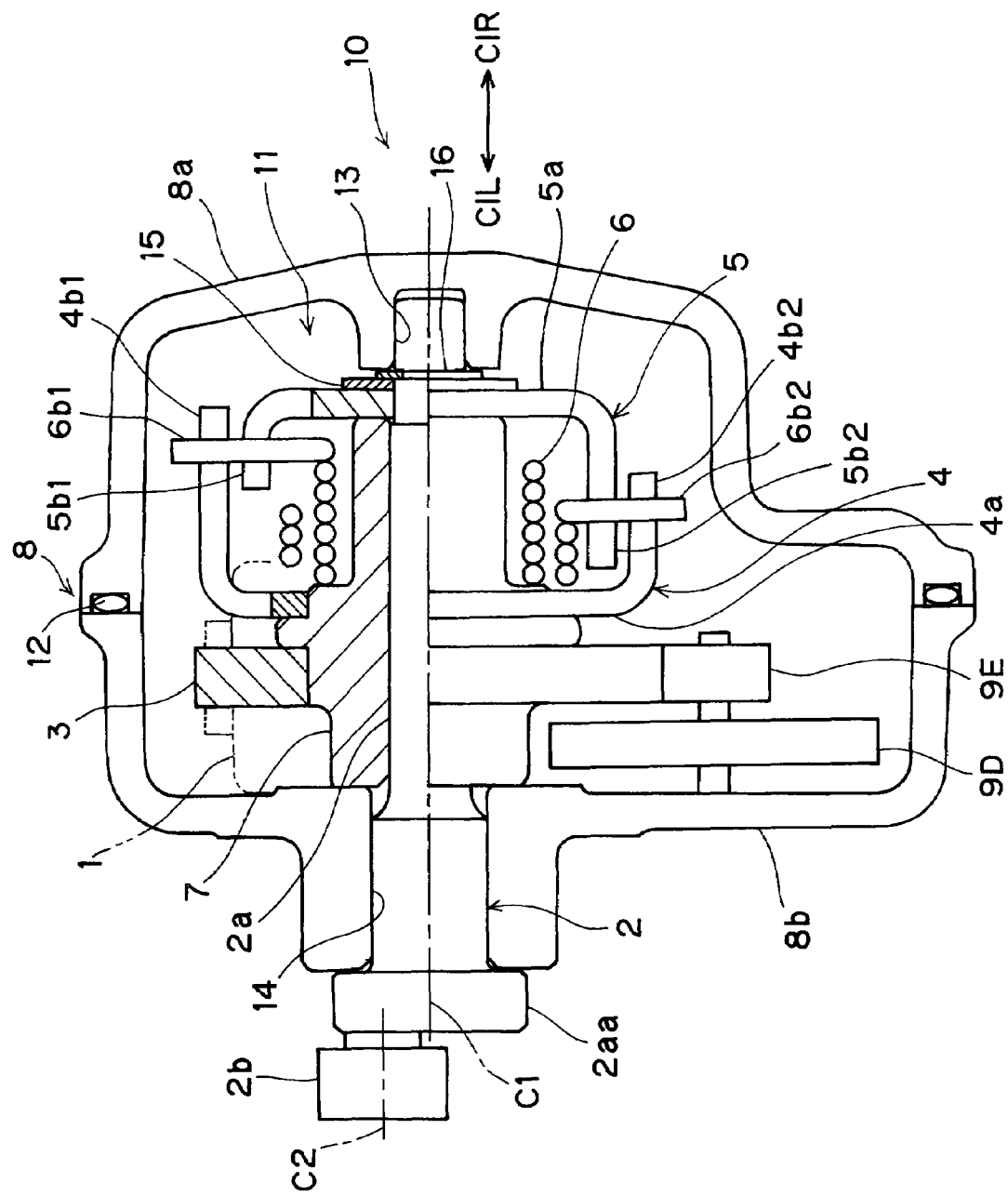
FIG. 1 is a longitudinal sectional view showing a drive transmission changer according to a first preferred embodiment of the present invention.

Hereinafter, a drive transmission changer according to a first preferred embodiment of the present invention will be described in detail with reference to the accompanying drawings. As shown in a longitudinal sectional view in FIG. 1, the drive transmission changer 10 includes a drive motor 1, which may be an electric reversible motor, an output shaft 2 having a shaft body 2a and an eccentric stud 2b, a gear 3 relatively rotatably mounted on the shaft body 2a of the output shaft 2 and drivingly coupled with the drive motor 1, a first transmission member 4 rotatable together with the gear 3, a second transmission member 5 rotatable together with the shaft body 2a of the output shaft 2, and a torsion coil spring 6 coupled between the first and second transmission members 4 and 5 in a coaxial relation with the shaft body 2a of the output shaft 2 for accumulating a drive force as the first transmission member 4 revolves about the shaft body 2a of the output shaft 2. Those component parts denoted respectively by 1, 3, 4, 5 and 6 are accommodated within a changer housing 8 of two-piece construction including a first casing 8a and a second casing 8b coupled together by means of a plurality of coupling screws with a sealing member 12 interposed therebetween. While the details will be described subsequently, it is to be noted that since the drive motor 1 so far as shown in FIG. 1 is positioned in a deeper region on one side of the output shaft 2 with respect to the plane of the sheet of FIG. 1, only a rear portion of the drive motor 1 is shown by double-dotted phantom line for the sake of brevity.

The shaft body 2a of the output shaft 2 is of a generally stepped cylindrical configuration including a reduced diameter portion and a large diameter portion. This output shaft 2 is rotatably supported by the changer housing 8 with a free end of the reduced diameter portion of the shaft body 2a journaled in a first bearing 13 integral with the first casing 8a and, also, with the large diameter portion of the shaft body 2a supported rotatably by a second bearing 14 integral with the second casing 8b. An output end portion of the shaft body 2a protruding outwardly of the changer housing 8, particularly the second casing 8b, is formed with a cylindrical collar 2aa. The eccentric stud 2b is formed integrally with, or otherwise rigidly secured to, the cylindrical collar 2aa so as to extend in a direction parallel to the shaft body 2a, but having a longitudinal axis C2 offset laterally from a longitudinal axis C1 of the shaft body 2a.

Within the changer housing 8, a cylindrical sleeve 7 is relatively rotatably mounted on a generally intermediate portion of the shaft body 2a, and the gear 3 and the first transmission member 4 are press-fitted onto, or otherwise connected by means of a spline or a D-cut with, the sleeve 7 for rotation together therewith. The sleeve 7 may be integrally formed with the gear 3 in a unitary piece. On the other hand, the second transmission member 5 is held in position to adjoin the sleeve 7, but is connected by means of a spline or a D-cut with, a right end portion of the shaft body 2a adjacent the first bearing 13 for rotation together with the output shaft 2. This second transmission member 5 so mounted on the shaft body 2a is retained in position substantially axially immovably by means of a washer 15 and an E-ring 16 both mounted on the shaft body 2a and positioned on one side opposite to the sleeve 7.

The torsion coil spring 6 is in the form of a double coiled spring disposed around the sleeve 7 in coaxial relation with the shaft body 2a of the output shaft 2 and has radially outwardly extending first and second engagement ends 6b1 and 6b2 opposite to each other. Specifically, the torsion coil spring 6 includes an inner coil portion so coiled as to extend from the first engagement end 6b1 in a direction towards an output side, or leftwards as viewed in FIG. 1, and an outer coil portion turned backwards from the inner coil portion so as to extend radially outwardly of the inner coil portion towards the second engagement end 6b2 in a rightward direction and counter to the direction of extension of the inner coil portion, with the first and second coil portions overlapping one above the other.

The first transmission member 4 is generally in the form of a plate member and includes a generally disc-shaped body 4a mounted on the sleeve 7 for rotation together therewith, and first and second arms 4b1 and 4b2 engageable with the first and second engagement ends 6b1 and 6b2 of the torsion coil spring 6, respectively. The first and second arms 4b1 and 4b2 integral with the disc-shaped body 4a of the first transmission member 4 extend a short distance from circumferentially opposite portions of the disc-shaped body 4a in respective directions away from each other and are then bent to extend in a first direction C1R (rightwards as viewed in FIG. 1) parallel to the longitudinal axis C1 of the shaft body 2a for engagement with the associated first and second engagement ends 6b1 and 6b2 of the torsion coil spring 6.

Similarly, the second transmission member 5 is generally in the form of a plate member and includes a generally disc-shaped body 5a mounted on the shaft body 2a of the output shaft 2 for rotation together therewith, and first and second arms 5b1 and 5b2 engageable with the first and second engagement ends 6b1 and 6b2 of the torsion coil spring 6, respectively. The first and second arms 5b1 and 5b2 integral with the disc-shaped body 5a of the second transmission member 4 extend a short distance from circumferentially opposite portions of the disc-shaped body 5a in respective directions away from each other and are then bent to extend in a second direction C1L (leftwards as viewed in FIG. 1) parallel to the longitudinal axis C1 of the shaft body 2a for engagement with the associated first and second engagement ends 6b1 and 6b2 of the torsion coil spring 6.

Figure 2:
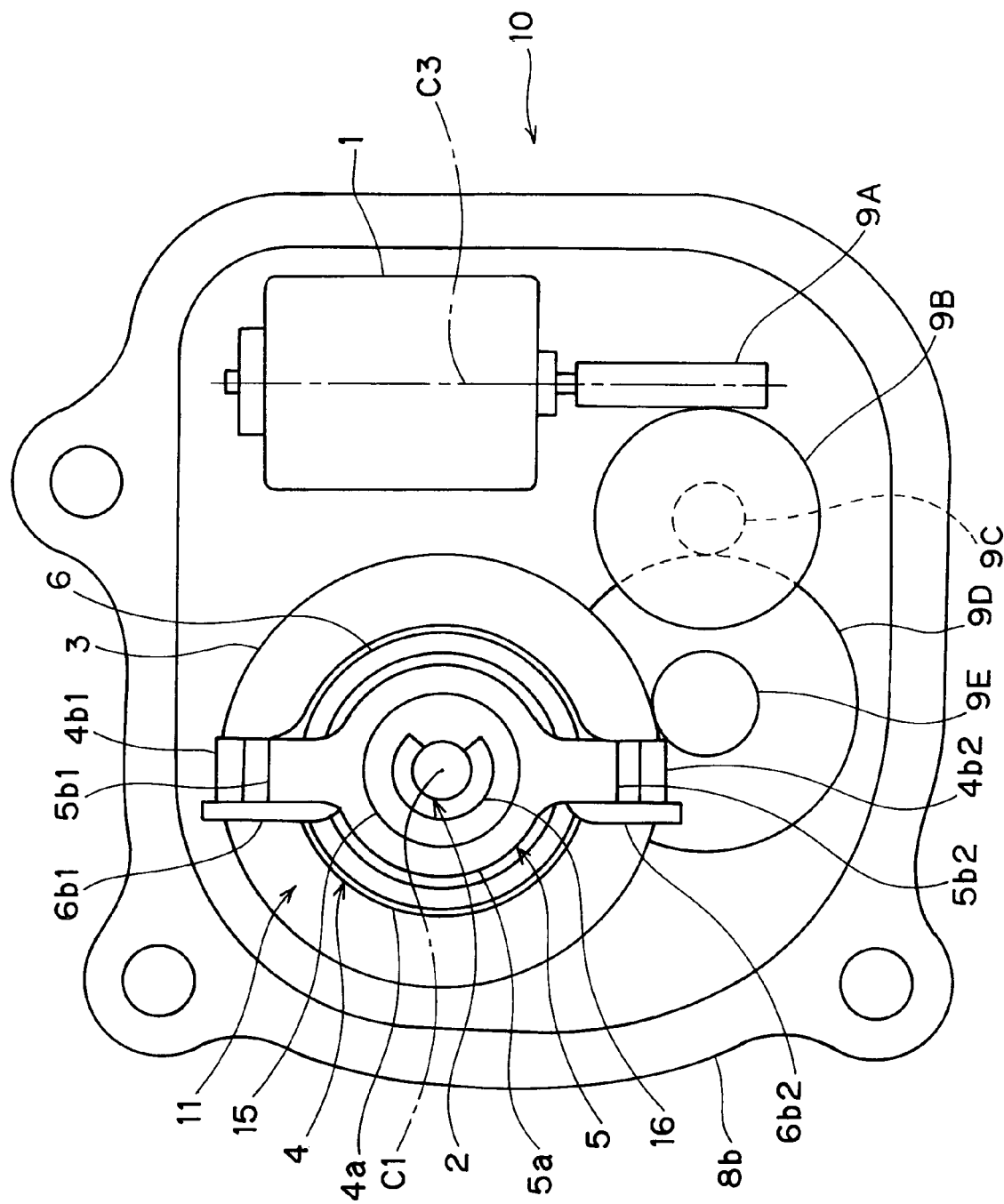
FIG. 2 is a right side view showing the drive transmission changer with a first casing removed away.

As shown in FIG. 2 showing a right side view of the drive transmission changer 10 with the first casing 8a removed away, a drive of the drive motor 1 is transmitted to the gear 3 and, hence, to the sleeve 7 through a reduction gear train including five gear members 9A, 9B, 9C, 9D and 9E all interposed between the gear 3 and a drive shaft of the drive motor 1 within the changer housing 8. The drive motor 1 has an axis of rotation C3 extending parallel to the plane of the sheet of FIG. 2 and spaced from the longitudinal axis C1 of the shaft body 2a of the output shaft 2 that extends in a direction perpendicular to the plane of the sheet of FIG. 2, but the axis of rotation C3 and the longitudinal axis C1, when viewed in FIG. 1, lie perpendicular to each other.

Figure 9:
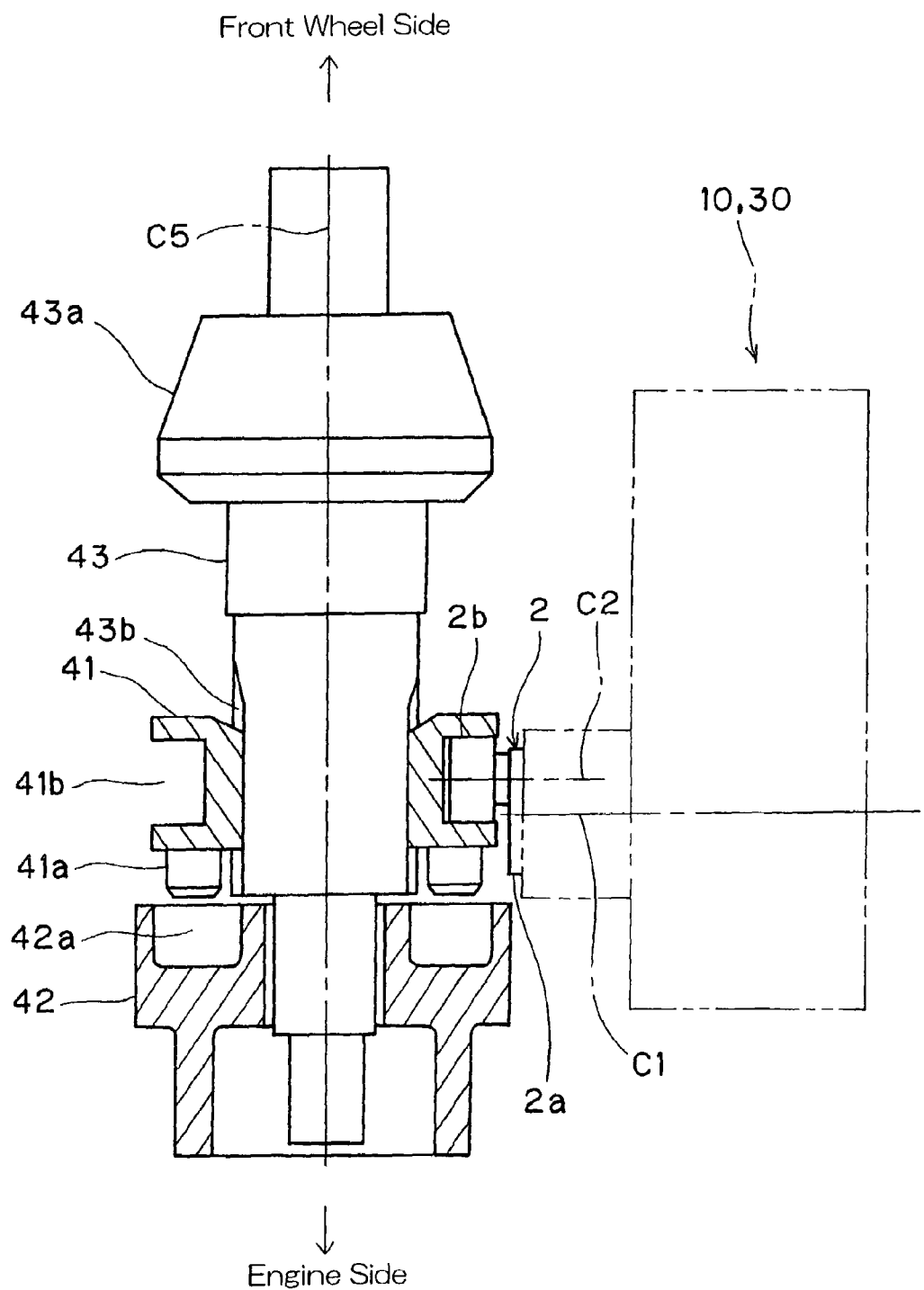
FIG. 9 is a longitudinal sectional view of the drive transmission changer according to either the first or the second embodiment of the present invention as applied in an automotive vehicle for selecting one of a two wheel drive mode and a four wheel drive mode, showing the drive transmission changer held in the drive decoupling position.

An example of use of the drive transmission changer 10 according to the first embodiment of the present invention in selectively changing one of a rear wheels drive mode (2WD or two-wheel drive mode) and a 4WD or four-wheel drive mode of an automotive vehicle is shown in a longitudinal sectional view in FIG. 9. A substantially cylindrical counter-shift member 42 drivingly coupled with an output shaft of an automotive power plant (not shown), i.e., a combustion engine, is shown as arranged on one side adjacent the automotive power plant or in a lower portion of FIG. 9, while a cylindrical front wheel drive shaft 43 is shown as arranged on the other side adjacent front wheels (not shown) or in an upper portion of FIG. 9. The front wheel drive shaft 43 has a bevel gear 43a formed integrally therewith, or otherwise rigidly mounted thereon and drivingly coupled with front left and right wheels (not shown) through respective wheel drive axles (not shown). A generally intermediate portion of the front wheel drive shaft 43 is formed with a plurality of axially extending spline grooves 43b, and a substantially cylindrical coupling shifter 41 having a corresponding number of axially extending spline teeth is mounted on that intermediate portion of the front wheel drive shaft 42 with the spline teeth axially slidably engaged in the respective spline grooves 43a. Accordingly, the coupling shifter 41 mounted on the front wheel drive shaft 42 is axially movable between engaging and disengaging positions and can rotate together with, but be axially movable independent of, the front wheel drive shaft 43. A rear end portion of the front wheel drive shaft 43 on one side remote from the bevel gear 43b extends through the counter-shift member 42 for rotation relative thereto. It is to be noted that the front wheel drive shaft 43, the coupling shifter 41 and the counter-shift member 42 have a common axis of rotation C5.

The coupling shifter 41 has a rear portion adjacent the counter-shift member 42 formed with a plurality of circumferentially equally spaced coupling pegs 41a and, on the other hand, the counter-shift member 42 is formed with corresponding coupling recesses 42a defined therein for receiving therein the coupling pegs 41a when the coupling shifter 41 is moved towards the counter-shift member 42 as will be described later. In any event, the coupling shifter 41 and the counter-shift member 42 altogether constitute a dog clutch for selectively connecting or disconnecting the shifter 41 and the counter-shift member 42 together or from each other, respectively.

Although FIG. 9 illustrates the coupling shifter 41 held in the disengaging position disengaging the front wheel drive shaft 43 from the counter-shift member 42 and, hence, from the automotive power plant, the coupling shifter 41 can be axially urged in a rearward direction towards the engaging position, at which the coupling pegs 41a can be engaged in the corresponding coupling recesses 42a, when the coupling shifter 41 and the counter-shift member 42 are held in a phase matched relation to each other, i.e., in respective positions at which the coupling pegs 41a are aligned with the respective coupling recesses 42a. As a matter of course, with the coupling pegs 41a engaged in the respective coupling recesses 42a with the coupling shifter 41 consequently held at the engaging position, the front wheel drive shaft 43 is drivingly coupled with the engine output shaft (not shown) through the coupling shifter 41 and the counter-shift member 42 as shown in FIG. 10.

Figure 10:
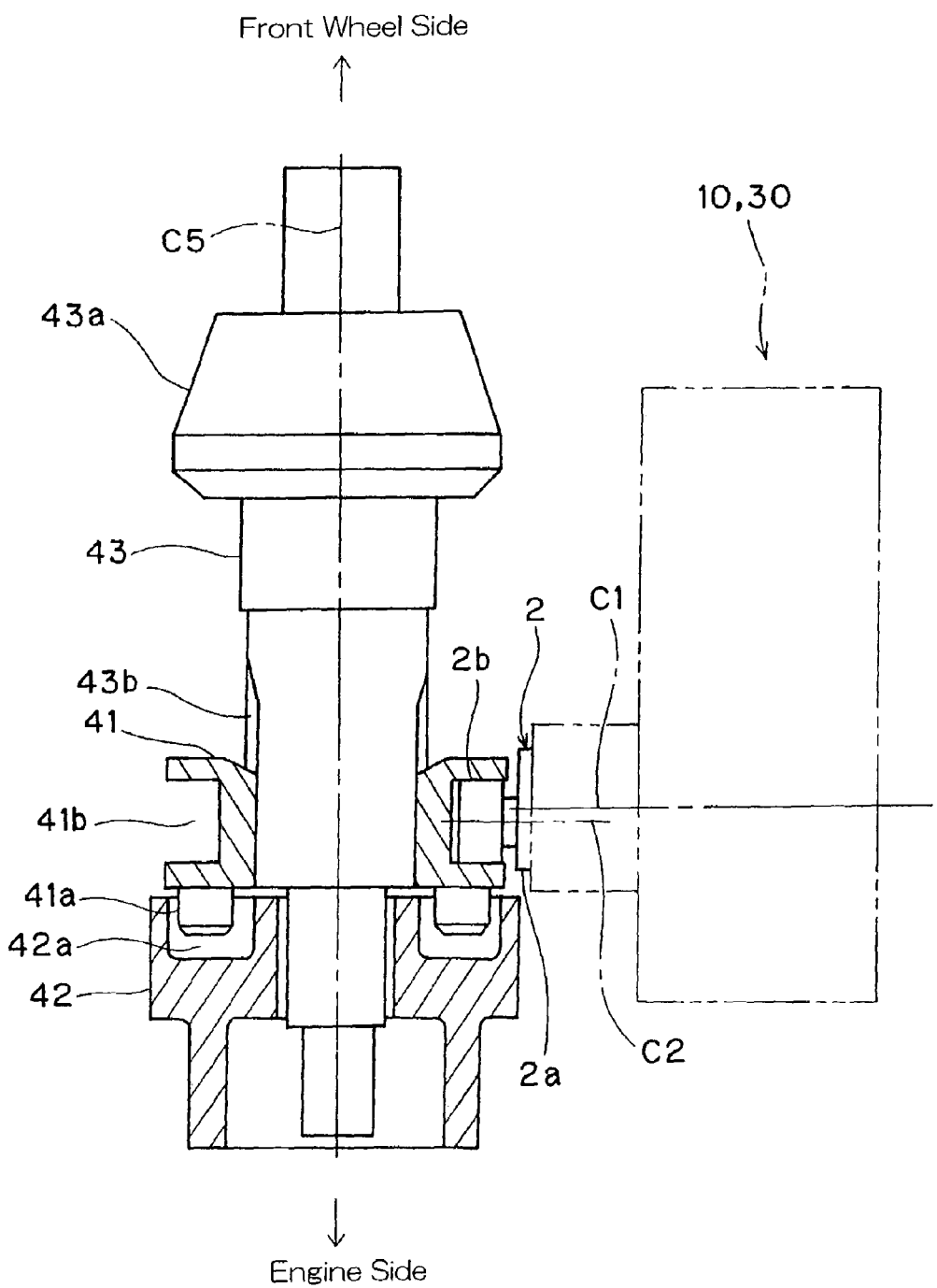
FIG. 10 is a longitudinal sectional view showing the drive transmission changer of FIG. 9 held in the drive coupling position.

Unless the engagement between the coupling shifter 41 and the counter-shift member 42 is firm and tough at the engaging position as shown in FIG. 10, the coupling pegs 41a of the shifter 41 can readily separate from the coupling recesses 42 of the counter-shift member 42 upon forward movement of the coupling shifter 41 towards the disengaging position and the drive transmission from the automotive engine to the front wheel drive shaft 43 is therefore interrupted as shown in FIG. 9.

The movement of the coupling shifter 41 between the engaging and disengaging positions in the manner described above is accomplished by the following manner. As best shown in FIGS. 9 and 10, the shifter 41 has a lateral portion formed with an annular groove 41b opening radially outwardly thereof, in which the eccentric stud 2b integral or rigid with the output shaft 2 of the drive transmission changer 10 is engaged slidably. Since the axis of rotation C5 of the shifter 41 lies perpendicular to the longitudinal axis C1 of the shaft body 2a of the output shaft 2, the shifter 41 can be axially moved between the engaging and disengaging positions by the eccentric stud 2b when the output shaft 2 is rotated about the longitudinal axis C1 of the shaft body 2a. Thus, it will readily be seen that the eccentric revolution of the eccentric stud 2b about the longitudinal axis C1 of the shaft body 2a results in a reciprocating axial motion of the shifter 41 between the engaging and disengaging positions. In practice, however, the output shaft 2 carrying the eccentric stud 2b rotates a predetermined angle, for example, 120 degrees about the longitudinal axis C1 of the shaft body 2a by the reason, which will become clear from the subsequent description, and, hence, the eccentric stud 2b can assume one of a forward position corresponding to the engaging position of the shifter 41 as shown in FIG. 9, and a rearward position corresponding to the disengaging position of the shifter 41 as shown in FIG. 10.

Figure 3:
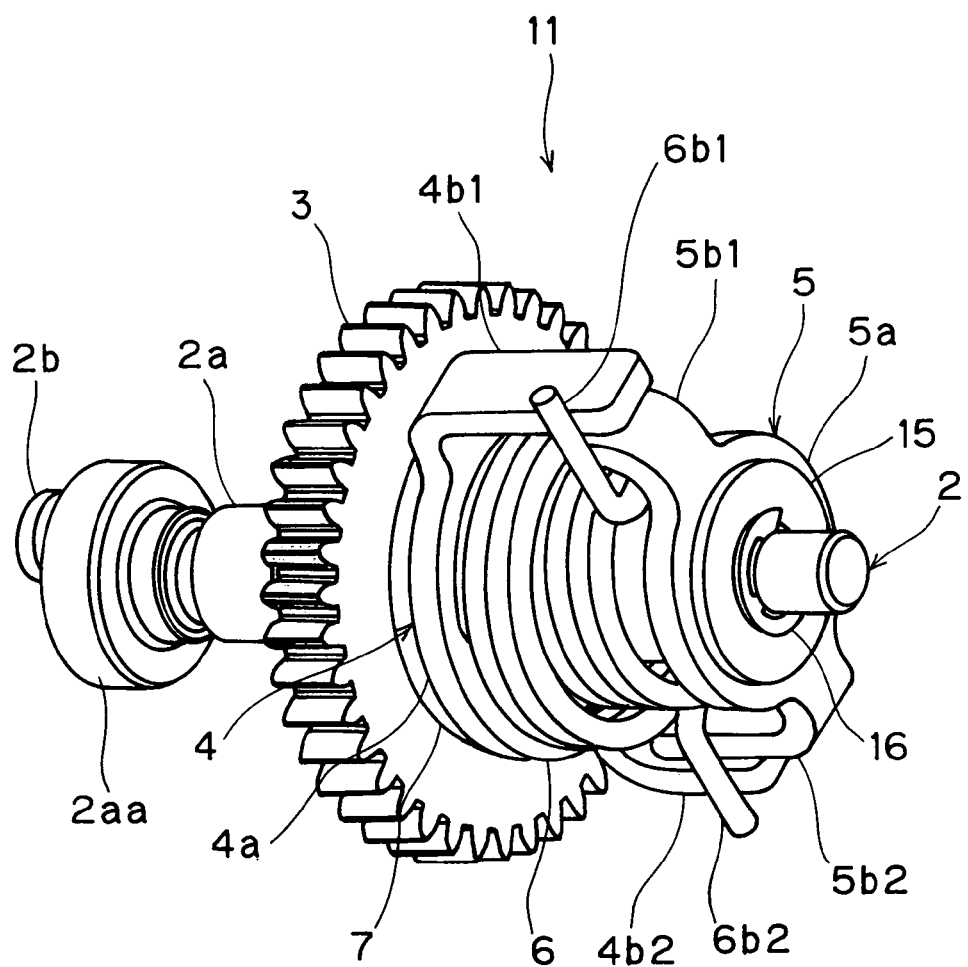
FIG. 3 is a perspective view showing a drive accumulating unit accommodated within a casing of the drive transmission changer.

The operation of the drive transmission changer 10 according to the foregoing embodiment will now be described, with attention centered on the movement of a drive accumulating unit 11. The drive accumulating unit 11 referred to previously is made up of the output shaft 2, the sleeve 7, the gear 3, the first and second transmission members 4 and 5 and the torsion coil spring 6 as best shown in FIG. 3. The drive transmission changer 10 shown in FIG. 2 is held in a drive decoupling position, at which time the drive accumulating unit assumes a position as shown in FIG. 4.

Figure 4:
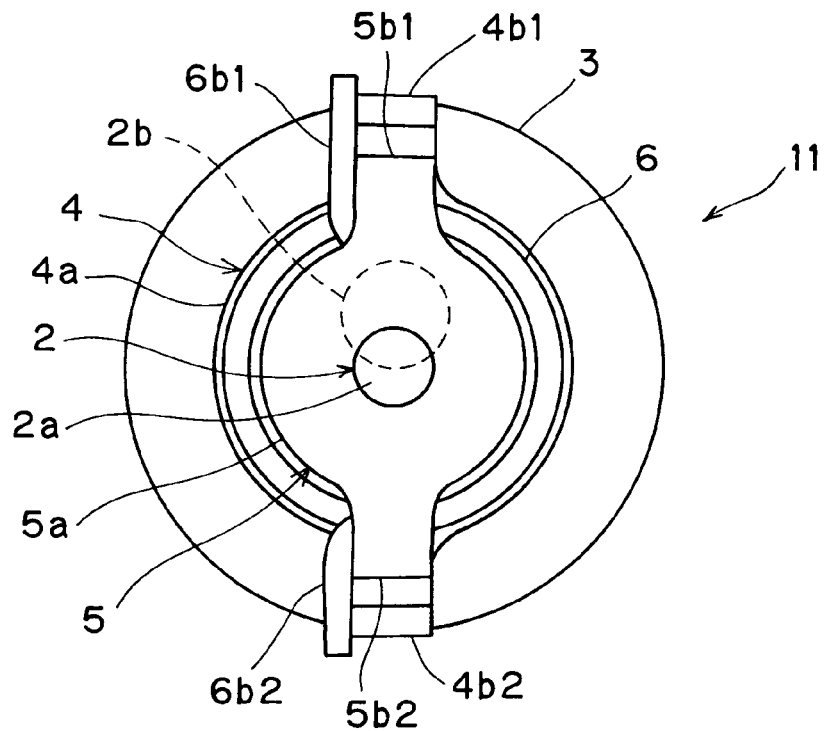
FIG. 4 is a plan view showing the drive accumulating unit in a condition when the drive transmission changer is held in a drive decoupling position.

It is, however, to be noted that for the sake of clarity, in FIG. 4, the washer 15 and the E-ring 16, both shown in FIG. 2 and used to retain the second transmission member 5 on the shaft body 2a substantially axially immovably, are not shown and the eccentric stud 2b fast with the output shaft 2 is shown by the broken line. This is also observed in each of FIGS. 5 to 7.

Figure 5:
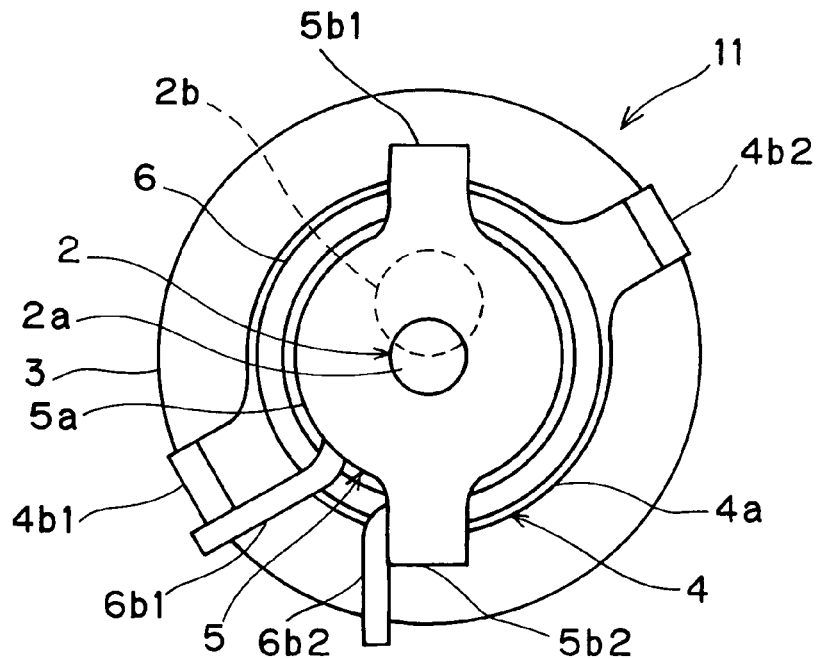
FIG. 5 is a plan view showing the drive accumulating unit held in a condition ready to receive a drive.

Starting from a drive decoupling position of the drive transmission changer 10 as shown in FIG. 4, in which as shown in FIG. 9, the eccentric stud 2d is held at the forward position and the shifter 41 is therefore held at the disengaging position, and in order for the drive transmission changer 10 to assume the drive coupling position as shown in FIG. 10, the drive motor 1 is driven in one direction to rotate the gear 3, together with the sleeve 7 and the first transmission member 4, through the reduction gear train, 120 degrees about the output shaft 2 in a counterclockwise direction as viewed in FIG. 5, followed by a halt of the drive motor 1. If at this time the shifter 41 and the counter-shift member 42 are in phase matched relation with each other, the drive transmission changer 10 immediately assumes the drive coupling position as shown in FIG. 6, with the output shaft 2 and the second transmission member 5 consequently rotated 120 degrees in the counterclockwise direction together with the gear 3 and the first transmission member 4.

However, if the shifter 41 and the counter-shift member 42 have not yet been in phase matched relation with each other at the time the gear 3 and, hence, the first transmission member 4, has been rotated 120 degrees in the counterclockwise direction about the output shaft 2, the coupling pegs 41a are unable to engage in the corresponding coupling recesses 42a in the counter-shift member 42, but slidingly contact discrete annular end walls of the counter-shift member 42 each situated between the neighboring coupling recesses 42a, with the drive transmission changer 10 consequently temporarily held in a wait position, as shown in FIG. 5, intermediate between the drive coupling and decoupling positions. During this condition taking place, the driving force exerted by the motor 1 is accumulated in the torsion coil spring 6 because while the second transmission member 5 rotatable together with the shaft body 2a has not yet been rotated, the torsion coil spring 6 has been torsioned with the engagement end 6b1 urged by the first transmission member 4, particularly the arm 4b1 then turned counterclockwise to approach the other arm 5b2 of the second transmission member 5.

Figure 6:
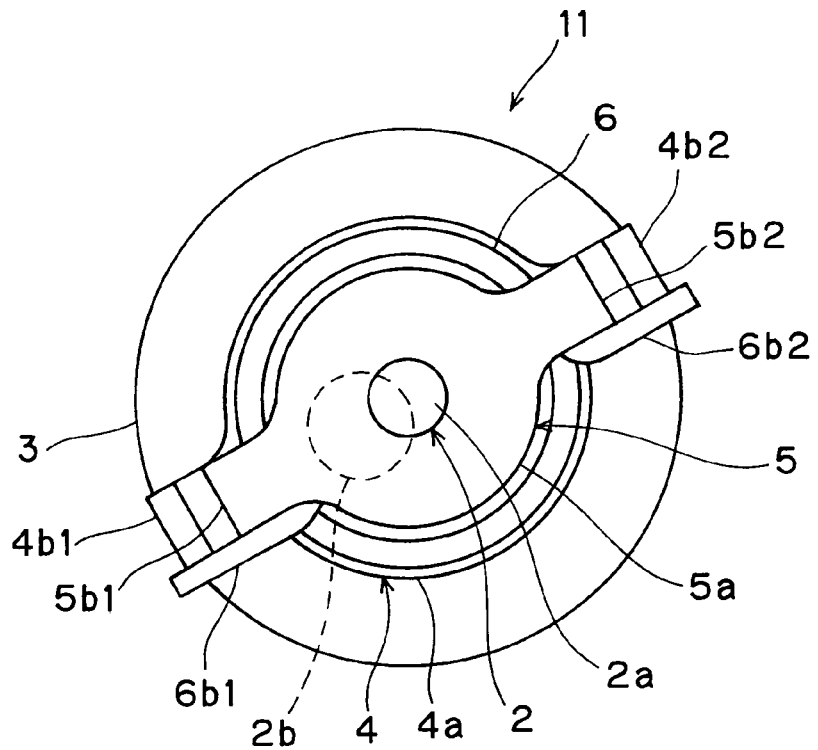
FIG. 6 is a plan view showing the drive accumulating unit in a condition when the drive transmission changer is held in a drive coupling position.

At the moment the shifter 41 and the counter-shift member 42 are subsequently brought into the phase matched relation with each other, the output shaft 2 and, hence, the second transmission member 5, is rotated 120 degrees in the counterclockwise direction, as shown in FIG. 6, by the effect of the driving force accumulated in the torsion coil spring 6 and, therefore, the drive transmission changer 10 is brought into the drive coupling position as shown in FIG. 6.

Reversal of the drive transmission changer 10 from the coupling position back to the decoupling position takes place when the drive motor 1 is again driven in the reversed direction to rotate the gear 3 and, hence, the first transmission member 4 through the reduction gear train, 120 degrees about the output shaft 2 in a clockwise direction as viewed in FIG. 6, followed by a halt of the drive motor 1. If at this time the engagement between the coupling shifter 41 and the counter-shift member 42 is not firm and tough, the shifter 41 can readily disengage from the counter-shift member 42, allowing the output shaft 2 and the second transmission member 5 to rotate 120 degrees clockwise together with the gear 3 and the first transmission member 4 to reposition the drive transmission changer 10 to the drive decoupling position as shown in FIG. 4.

Figure 7:
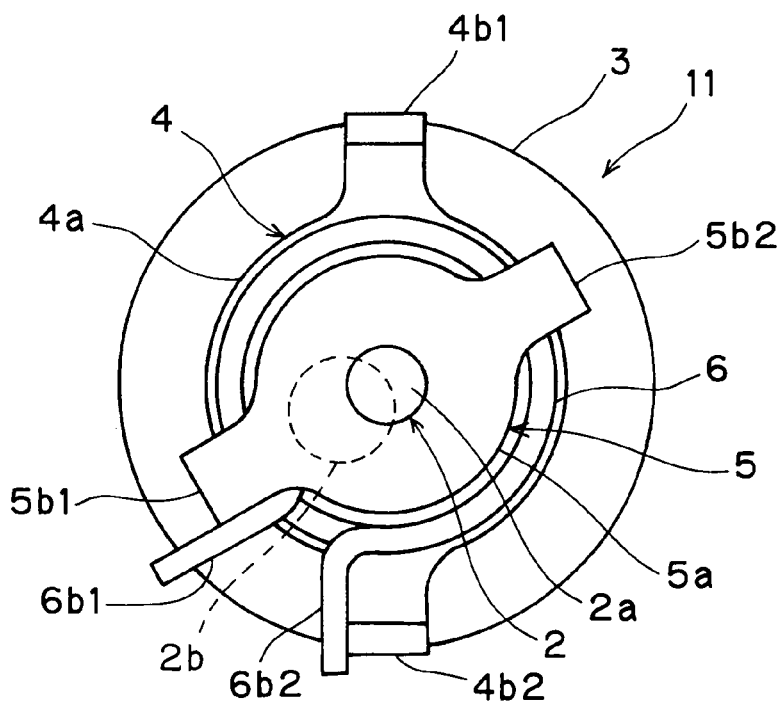
FIG. 7 is a plan view showing the drive accumulating unit in a condition when the drive transmission changer is held in position ready to be decoupled.

However, if when the gear 3 together with the first transmission member 4 has been rotated 120 degrees in the clockwise direction as described above, the engagement between the coupling shifter 41 and the counter-shift member 42 is so firm and so tough that changeover from the drive coupling position to the drive decoupling position may not quickly take place, the output shaft 2 together with the second transmission member 5 is unable to rotate clockwise and the drive transmission changer 10 is held temporarily at a wait position as shown in FIG. 7, with the torsion coil spring 6 being torsioned to accumulate the driving force exerted by the drive motor 1, in a manner substantially similar, but reversal to the accumulation of the driving force in the torsion coil spring during the repositioning of the drive transmission changer 10 from the drive decoupling position to the drive coupling position.

When the drive transmission changer 10 is subsequently brought in position ready to switch over to the drive decoupling position from the wait position as shown in FIG. 7, at which time the engagement between the coupling shifter 41 and the counter-shift member 42 becomes loosened enough to allow the shifter 41 to disengage from the counter-shift member 42, the output shaft 2 together with the second transmission member 5 is rotated 120 degrees in the clockwise direction by the effect of the driving force accumulated in the torsion coil spring 6, accompanied by 120 degrees clockwise rotation of the output shaft 2 and the second transmission member 5 and, therefore, the drive transmission changer 10 is therefore brought into the drive decoupling position as shown in FIG. 4.

With the drive transmission changer 10 of the foregoing embodiment having been so constructed as hereinabove described, the torsion coil spring 6 accumulates the driving force of the motor 1 through the rotation of the gear 3 and the first transmission member 4 and, therefore, the drive transmission can be assuredly changed with no need of a complicated electric control. Also, since the torsion coil spring 6 is employed rather than a large size spiral spring, the drive transmission changer 10 can be assembled compact in size. Also, considering that the first and second transmission members 4 and 5 can be formed of a metallic plate member by the use of any known bending work, the manufacture can be easy and inexpensive to accomplish. In addition, all of the movable component parts except for the output shaft 2 are accommodated within the changer housing 8, the sealability thereof relative to the outside environment can increase.

Figure 8:
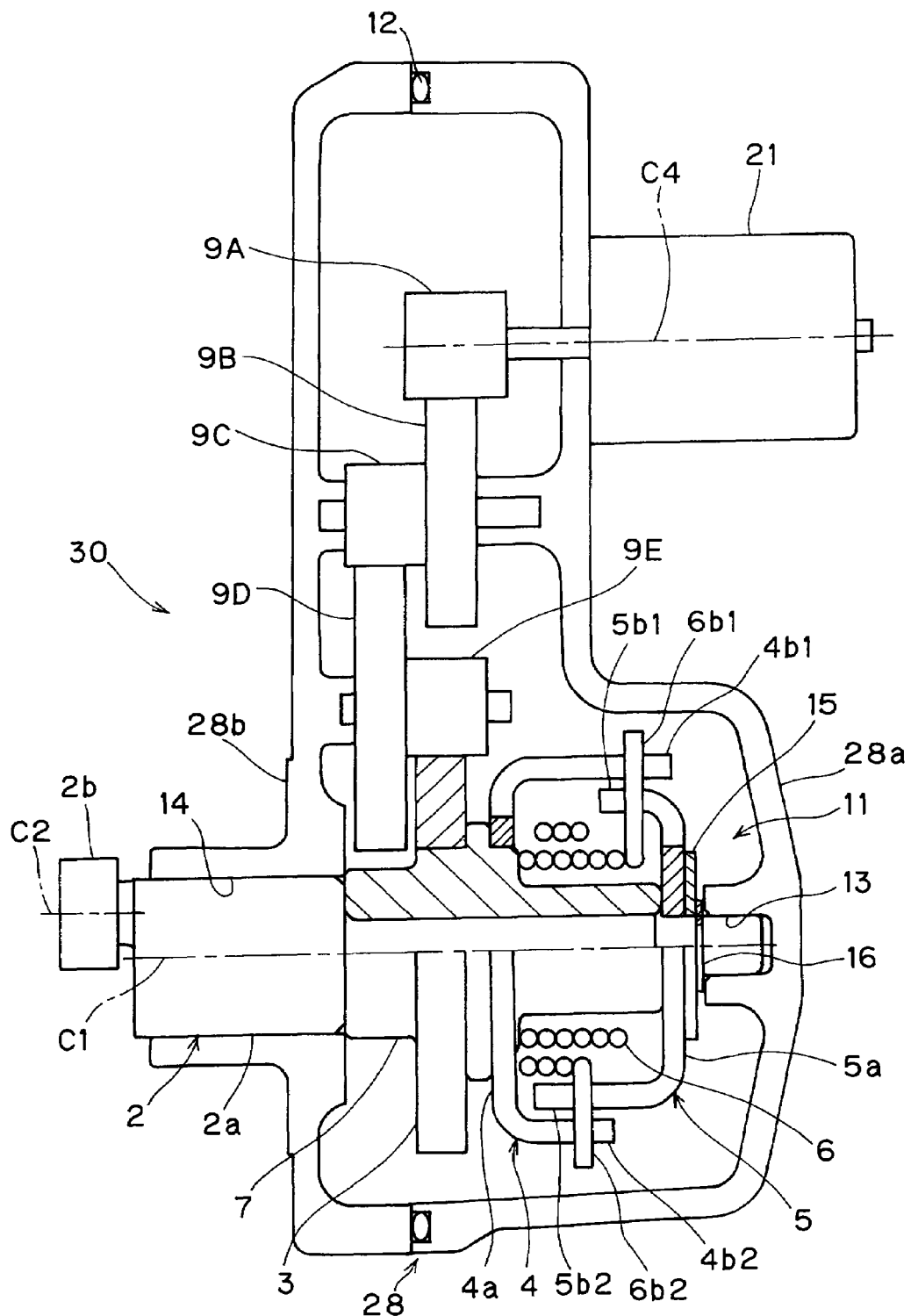
FIG. 8 is a longitudinal sectional view showing the drive transmission changer according to a second preferred embodiment of the present invention.

The drive transmission changer according to a second preferred embodiment of the present invention will now be described with particular reference to FIGS. 8. The drive transmission changer 30 shown therein is substantially similar to the drive transmission changer 10 according to the previously described first embodiment except that in this second embodiment, a drive motor 21 corresponding to the drive motor 1 shown in FIG. 1 is positioned outside, but supported by a changer housing 28, made up of first and second casings 28a and 28b coupled together. This drive motor 30 has a axis of rotation C4, represented by a drive shaft thereof, which axis C4 lies parallel to the longitudinal axis C1 of the shaft body 2a of the output shaft 2.

Other structural features of the drive transmission changer 30 than those described above are substantially similar to those employed in the drive transmission changer 10 according to the previously described first embodiment and, therefore, the details thereof are not reiterated for the sake of brevity. It is, however, to be noted that even the drive transmission changer 30 according to the second embodiment is provided equally with the drive accumulating unit 11 as is the case with the drive transmission changer 10 according to the first embodiment and does therefore function in a manner similar to and brings about effects similar to those afforded by the drive transmission changer 10 according to the first embodiment.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A drive transmission changer for a dog clutch of a vehicle which comprises:
   a drive motor;
   an output shaft including a shaft body and an eccentric stud formed at an output end portion of the output shaft and positioned offset laterally from a longitudinal axis of the shaft body and is adapted to be engaged with a coupling shifter of the dog clutch;
   a gear mounted on the shaft body for rotation relative thereto and drivingly coupled with the drive motor;
   a first transmission member rotatable together with the gear;
   a second transmission member mounted on the shaft body for rotation together therewith; and
   a torsion coil spring operatively coupled between the first and second transmission members and arranged coaxially with the shaft body of the output shaft for accumulating a drive force as the first transmission member rotates.

2. The drive transmission changer as claimed in claim 1, further comprising a sleeve mounted on the shaft body of the output shaft for rotation relative thereto, the gear and the first transmission member being mounted on the sleeve for rotation together therewith.

3. The drive transmission changer as claimed in claim 2, wherein the first transmission member is made of a plate member including a body of the first transmission member mounted on the sleeve, and a pair of arms extending from respective opposite portions of the body of the first transmission member in a first axial direction parallel to a longitudinal axis of the shaft body and engaged respectively with opposite engagement ends of the torsion coil spring, and wherein the second transmission member is made of a plate member including a body of the second transmission member mounted on the shaft body of the output shaft, and a pair of arms extending from respective opposite portions of the body of the second transmission member in a second axial direction counter to the first axial direction and engaged respectively with the opposite engagement ends of the torsion coil spring.

4. The drive transmission changer as claimed in claim 3, wherein the torsion coil spring comprises a double coiled spring.

5. The drive transmission changer as claimed in claim 1, further comprising a changer housing accommodating therein the motor, the gear, the first and second transmission members and the torsion coil spring.

6. The drive transmission changer as claimed in claim 1, further comprising a changer housing accommodating therein the gear, the first and second transmission members and the torsion coil spring and wherein the drive motor is positioned outside of, but supported by the changer housing.

7. The drive transmission changer as claimed in claim 6, wherein the drive motor has an axis of rotation thereof, which lies parallel to a longitudinal axis of the shaft body of the output shaft.

8. The drive transmission charger as claimed in claim 3 wherein the body of the first transmission member is fixedly mounted on the sleeve and the body of the second transmission member is fixedly mounted on the shaft body, the pair of arms of the first transmission member are radially offset from the pair of arms of the second transmission member, and the torsion coil spring is captured between the body of the first transmission member and the body of the second transmission member and extends around the sleeve.

9. The drive transmission changer as claimed in claim 8 wherein the torsion coil spring comprises a double coiled spring with a first coil adjacent the sleeve having an engagement end extending radially outward for engagement with one of the arms respectively of the first and second transmission members and a second coil surrounding the first coil having an engagement end extending radially outward for engagement with the other of the arms respectively of the first and second transmission members at a position displaced from the opposite engagement ends of the double coiled torsion spring along the longitudinal axis of the shaft body.

10. A drive transmission changer for a dog clutch of a vehicle which comprises:
   a drive motor;
   an output shaft including a shaft body and an eccentric stud formed at an output end portion of the output shaft and positioned offset laterally from a longitudinal axis of the shaft body and adapted to be engaged with a coupling shifter of the dog clutch;
   a gear mounted on the shaft body for rotation relative thereto and drivingly coupled with the drive motor;
   a first transmission member rotatable together with the gear;
   a sleeve member mounted on the shaft body of the output shaft for rotation relative thereto, the gear and the first transmission member being mounted on the sleeve for rotation together therewith;

a second transmission member mounted on the shaft body for rotation together therewith; and a torsion coil spring operatively coupled between the first and second transmission members and arranged coaxially with the shaft body of the output shaft for accumulating a drive force as the first transmission member rotates, wherein the torsion coil spring has a first engagement end extending radially outward for engagement with a first arm extending from one of the first transmission member and the second transmission member and a second engagement end extending radially outward for engagement with a second arm extending from another of the first transmission member and the second transmission member, wherein relative rotation of the first engagement end and the second engagement end of the torsion coil spring accumulates the drive force.

11. A drive transmission changer for a dog clutch of a vehicle which comprises:

a drive motor;

an output shaft including a shaft body and an eccentric stud formed at an output end portion of the output shaft and positioned offset laterally from a longitudinal axis of the shaft body and is adapted to be engaged with a coupling shifter of the dog clutch;

a gear mounted on the shaft body for rotation relative thereto and drivingly coupled with the drive motor;

a first transmission member rotatable together with the gear;

a second transmission member mounted on the shaft body for rotation together therewith; and means for accumulating a shifting drive force from rotation of the gear when the eccentric stud is not in a phase matched drive coupling relationship with the coupling shifter of the dog clutch including a torsion coil spring operatively coupled between the first and second transmission members and arranged coaxially with the shaft body of the output shaft for accumulating a drive force as the first transmission member rotates wherein the accumulated drive force can rotate the second transmission member to a drive coupling position when the eccentric stud is in the phase matched drive coupling relationship with the coupling shifter.

* * * * *